United States Patent
Windecker

(10) Patent No.: US 6,405,644 B1
(45) Date of Patent: Jun. 18, 2002

(54) ENVIRONMENTALLY CONTROLLED STORAGE AND RIPENING APPARATUS

(76) Inventor: Robert J. Windecker, 6145 Celadon Cir., Palm Beach Gardens, FL (US) 33418

( * ) Notice: Subject to any disclaimer, the term of this patent is extended or adjusted under 35 U.S.C. 154(b) by 0 days.

(21) Appl. No.: 09/974,148

(22) Filed: Oct. 10, 2001

(51) Int. Cl.$^7$ .............................. A23L 1/00; A23L 3/00; A23B 7/00; A23B 7/144; A23B 7/152

(52) U.S. Cl. .............................. 99/468; 99/467; 99/473; 99/475; 99/476; 62/78; 62/329; 62/408; 62/419; 454/118; 454/292

(58) Field of Search ..................... 99/352–355, 467, 99/468, 472–476, 477, 484, 485, 516, 517, 534, 483; 34/192, 194, 196, 197, 222, 487, 231, 34, 212, 219; 62/329, 209, 78, 89, 381, 408, 239, 179, 414, 419, 127, 141, 303, 374, 384, 404, 256, 298; 165/65; 312/236, 116; 432/152; 454/292, 118, 173, 174, 228, 181; 426/419, 418, 263

(56) References Cited

U.S. PATENT DOCUMENTS

| | | | |
|---|---|---|---|
| 4,879,877 A | * 11/1989 | Hicke | 62/329 X |
| 4,894,997 A | * 1/1990 | Urushizaki et al. | 99/468 X |
| 5,121,877 A | 6/1992 | Bodary et al. | |
| 5,273,170 A | 12/1993 | Azzopardi et al. | |
| 5,318,789 A | * 6/1994 | Nakagawa et al. | 426/316 |
| 5,373,780 A | * 12/1994 | Bianco | 99/475 |
| 5,419,153 A | * 5/1995 | Hartley | 99/468 X |
| 5,457,963 A | * 10/1995 | Cahill-O'Brien et al. | 422/40 X |
| 5,566,608 A | * 10/1996 | Vejdani et al. | 99/475 X |
| 5,623,105 A | * 4/1997 | Liston et al. | 62/78 |
| 5,660,057 A | * 8/1997 | Tyree et al. | 62/384 |
| 5,671,609 A | 9/1997 | Lionetti | |
| 5,715,685 A | * 2/1998 | Takasugi | 62/239 X |
| 5,778,557 A | * 7/1998 | Leavens | 99/474 |
| 5,789,007 A | * 8/1998 | Bianco | 99/468 X |
| 5,801,317 A | * 9/1998 | Liston et al. | 99/468 |
| 5,899,084 A | 5/1999 | Franaszek et al. | |
| 5,996,366 A | 12/1999 | Renard | |
| 6,077,160 A | 6/2000 | Franaszek et al. | |

* cited by examiner

Primary Examiner—Timothy F. Simone
(74) Attorney, Agent, or Firm—McHale & Slavin

(57) ABSTRACT

The present invention describes an apparatus useful for maintaining perishable products in a controlled environment as a modular unit. This modular unit, or self-contained apparatus, encompasses all the equipment necessary for installation while offering temperature stability, simplified maintenance requirements, and ultimately, precise control of ripening. Designed for efficiency, typical labor and equipment costs and energy consumption of a ripening room are reduced with the palletized ripening cabinet. The present invention may also be easily adapted for the combination of units or for various temperature requirements and otherwise from pre-cooler to freezer.

11 Claims, 9 Drawing Sheets

Section A-A

Section B-B

Section C-C

ENVIRONMENTALLY CONTROLLED STORAGE AND RIPENING APPARATUS

FIELD OF THE INVENTION

The present invention relates to an apparatus for the controlled storage and ripening of perishable products; more particularly to a modular system of equipment placement to precisely control airflow and temperature for effective ripening of perishable products; and most particularly to achieving the most overall efficiency in reducing labor and equipment costs.

BACKGROUND OF THE INVENTION

Ripening rooms are well-known in the art for enabling precisely controlled ripening of perishable products such as bananas, tomatoes, avocados, kiwi, mangoes and the like. The fruits and vegetables are harvested immature and shipped refrigerated to distribution centers where they are matured in ripening rooms. Various methods have been employed to control air flow and inside temperature by altering room design, pallet or container size and location within the room, or even the method in which product is unloaded and loaded onto trucks in and out of the room.

Most modern ripening rooms utilize a "drive-in" style rack to stack pallets in 2-tier or 3-tier placement to conserve warehouse floor space. In conserving floor space, the stacked boxes of produce reach a height requiring specialized forklifts. Contrary to the rest of the warehouse which generally employs the standardized narrow-aisle forklifts, narrow counterbalanced type forklifts must be utilized to load and unload pallets within the typical ripening room because their narrow masts will fit between the load rails of the drive-in rack. This type of forklift is required to be driven into the room each time a pallet is to be loaded or unloaded, resulting in excessive labor costs when executed at full scale. This need for specialized forklifts puts the typical ripening room at a disadvantage from a perspective of equipment and labor cost. By way of example, a 3-tier, 42 pallet ripening room may require an hour or more to load or unload, which is then multiplied by 20 or greater for the total number of ripening rooms a distribution center customarily employs. In addition, driving the heavy pallets, while raised over 10 feet in the air, down a narrow corridor between the pallet rack load rails is not only time-consuming, but also may result in damage to the forklift, fruit pallet, or other structures associated within a ripening room.

The refrigeration system of a typical ripening room is capable of producing (in British Thermal Units per pound) approximately 2 BTU/lb of produce; the determining factor in the calculation and regulation of the desired ripening schedule. In order to trigger the onset of ripening, ethylene gas, acting as a plant hormone, is introduced into the ripening room. The concentration and duration of ethylene gassing varies with the type of fruit. The amount of ethylene used is then calculated based on the volume of the ripening room.

Cold storage rooms and pre-coolers are other types of refrigerated rooms utilized in product storage. Unlike the "drive-in" style pallet rack of prior art ripening rooms, cold storage rooms are usually arranged with narrow aisles for high-density storage of the "select" type storage racks. The preferred narrow-aisle forklifts with outriggers "select" (rapidly add and remove) pallets from the pallet rack. Fruits and vegetables requiring a lower temperature than 40° F. may be a major cost factor. Additionally, several coolers may be required in order to properly store ethylene producers separately from ethylene-sensitive fruits and vegetables.

Some cold storage rooms are made "gas tight" for controlled atmosphere storage for products such as flowers, some fruits, vegetables, and meats. For instance, the physiological condition of apples can be maintained for six months in controlled atmosphere storage. Nevertheless, in addition to the heavy expense to install, these rooms promote environment hazardous to the workers who must enter the controlled atmosphere room.

Pre-coolers are designed to remove field heat from freshly harvested produce or flowers. Forced-air pre-coolers are often located in cold rooms, preferably near the harvest site. However, the expense, delivery time, and installation time of pre-coolers can be considerable.

Freezers pose further structural and operational challenges. Floors must be insulated and heated in order to prevent floor heaving. The entrance doors require enhanced insulation. Also, forklifts and human operators must work for sustained periods in the sub-freezing environment.

Thus, if a self-contained modular storage unit could be designed for the controlled ripening of products which was also customizable for related refrigeration and cold storage utilities and could be provided in a cost-effective manner which is simple to implement, provides compatibility with the standard narrow-aisle forklifts, and is without substantial hazard to workers, a long-felt need would be realized.

DESCRIPTION OF THE PRIOR ART

U.S. Pat. No. 6,077,160 discloses a ripening room for perishable products in which the air flow and temperature are closely controlled by the room construction and by a cooling control system that archives uniform ripening of the fruit regardless of its location within the room. Uniform ripening is achieved by circulating cooling air uniformly through the fruit. This method also incorporates adjusting the amount or temperature of cooled air introduced into the operational area to some intermediate point to eliminate dehydration or undercooling. Particularly disclosed features include an air distribution ceiling designed to encourage uniform air pressure along the tops and sides of the fruit boxes throughout the entire room, a temperature set point controller, and an air mixing chamber. U.S. Pat. No. 6,077,160 is a division of U.S. Pat. No. 5,899,084, wherein the former claims the room for ripening and the latter describes the method of controlling the operation of a ripening room cooling system. These inventions do not contemplate a self-contained structure for ripening products to be positioned within a room.

U.S. Pat. No. 5,671,609 discloses a method for a controlled environment for the portable storage of produce, wherein the following objectives are accomplished: initiated ripening; ripening; cooling and heat removal; temperature stabilization; and the loading and unloading of palletized fruit on skid-mounted rollers (for effortless movement once inside). The trailer apparatus is designed to hold pallets within its insulated rectilinear cabin. The invention the prior need for temporary fruit storage space which can be increased and decreased in size. It is essential to this invention that ceiling-mounted air cooling units are uniformly distributed throughout the trailer along the long edge of the palletized fruit. An air suction chamber is included. This patent fails to contemplate the further placement of the insulated cabin into the ripening room.

U.S. Pat. No. 5,419,153 provides a method and apparatus for ripening fruit, with particular reference to the construction and operation of banana ripening rooms. The ripening room construction incorporates a means for receiving a plurality of stacked loaded pallets in at least two spaced apart rows, a fan means resulting with air passing through pallets, and a sealing means comprising a flexible flap means. A false ceiling holds four blower fans for air circulating and conditioning. This patent fails to contemplate a self-contained structure for ripening which can be placed within a room.

U.S. Pat. No. 5,121,877 teaches a container, adapted to be stacked in a pallet load, for ripening of fruit during storage and shipment in a controlled environment. This patent fails to contemplate a fully self-contained structure for ripening products which can be easily installed and relocated as necessary within a ripening room.

SUMMARY OF THE INVENTION

The present invention is directed toward alleviating existing problems associated with the installation and daily operating activities surrounding ripening rooms and related controlled environment facilities by providing a self-contained and versatile palletized cabinet for the precise control of ripening. Some examples of the many elements providing improvement are the location of cooling units; configuration of access doors; interrelationship between pallets and pallet cabinet; modular footprint; energy efficiency; labor efficiency; and placement flexibility.

The present invention is predicated upon a non-specialized modular base construction unit adaptable for use as a cooler, a controlled atmosphere cooler, a freezer, a pre-cooler, a ripening room, or the like. For purposes of illustration, a ripening room will be described, although any of the alternative embodiments are contemplated. In addition, no construction is necessary in order to place several units together. The integral refrigeration and location of the unit cooler allow for ease in maintenance needs and protection of the produce boxes stored within from overhead drops of condensation. Cost-benefit is achieved through the use of warehouse standard narrow-aisle reach-type forklifts, larger, lower speed fans, and a smaller size of evaporator coils. Additionally, the design and location of the door minimizes air leakage, heat transfer, and reduces potential damage.

The modular style of the present invention offers many advantages over the installation of a typical ripening room. Ripening rooms are most often designed to fit within a warehouse area and as such are custom designed and manufactured. A ripening room can require thirty to forty man days of mechanical, electrical, and refrigeration labor to install. Although numerous configurations are contemplated, in a preferred embodiment, the palletized base unit cabinet is manufactured in two sizes, a 2-tier 24-pallet model and a 3-tier 24-pallet model. Older warehouses and smaller warehouses which do not have the interior height for a 3-tier model may utilize the 2-tier model. Standard drawings and standard parts are used for these two models. Insulated panels for the chamber walls, an integral structural support locating means for proper pallet positioning, a unit cooler, motor starters, controls, a wiring harness, and other components are designed and manufactured for minimum labor requirements providing rapid assembly at the job site. Installation of a palletized cabinet requires approximately one-half the labor of a comparable ripening room. In the construction of prior art ripening rooms, building permits must be obtained, whereas palletized cabinets are more akin to appliances and may not require permits.

Since the present invention does not require curbs or support from the warehouse structure, the cabinets of the instant invention can be added, moved, or removed as the warehouse business changes. However, relocating a traditional ripening room is very expensive and time consuming, often prohibitively so.

Accordingly, it is an objective of the instant invention to provide a self-contained apparatus adapted to provide and maintain a controlled environment, e.g. for the ripening of perishable products.

It is a further objective of the instant invention to provide a self-contained apparatus which is inexpensive to install and maintain.

It is yet another objective of the instant invention to provide a safe and reliable apparatus for storage and ripening of perishable products.

It is a further objective of the present invention to provide a self-contained apparatus which maintains stability for product storage at a variety of temperature requirements.

It is a still further objective of the invention to provide a self-contained apparatus which is simple to relocate as needed.

It is yet another objective of the instant invention to provide a self-contained apparatus allowing efficient loading and unloading of product and ease of accessibility via standard warehousing devices (forklifts, etc.).

It is a further objective of the present invention to provide a self-contained apparatus which can be combined with at least one other self-contained apparatus.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
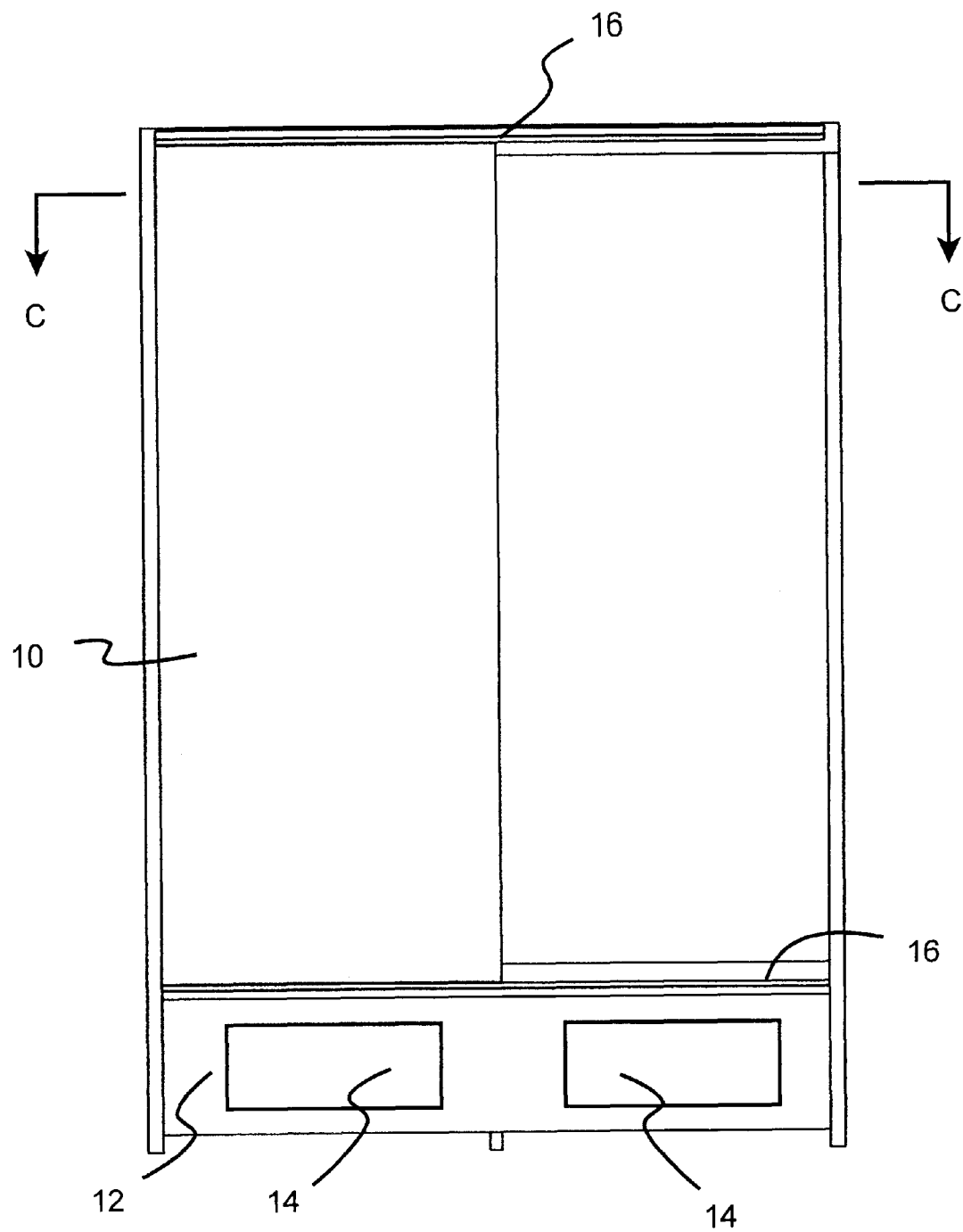
FIG. 1 is a front view of a 3-tier palletized ripening embodiment of a self-contained apparatus.
Figure 2:
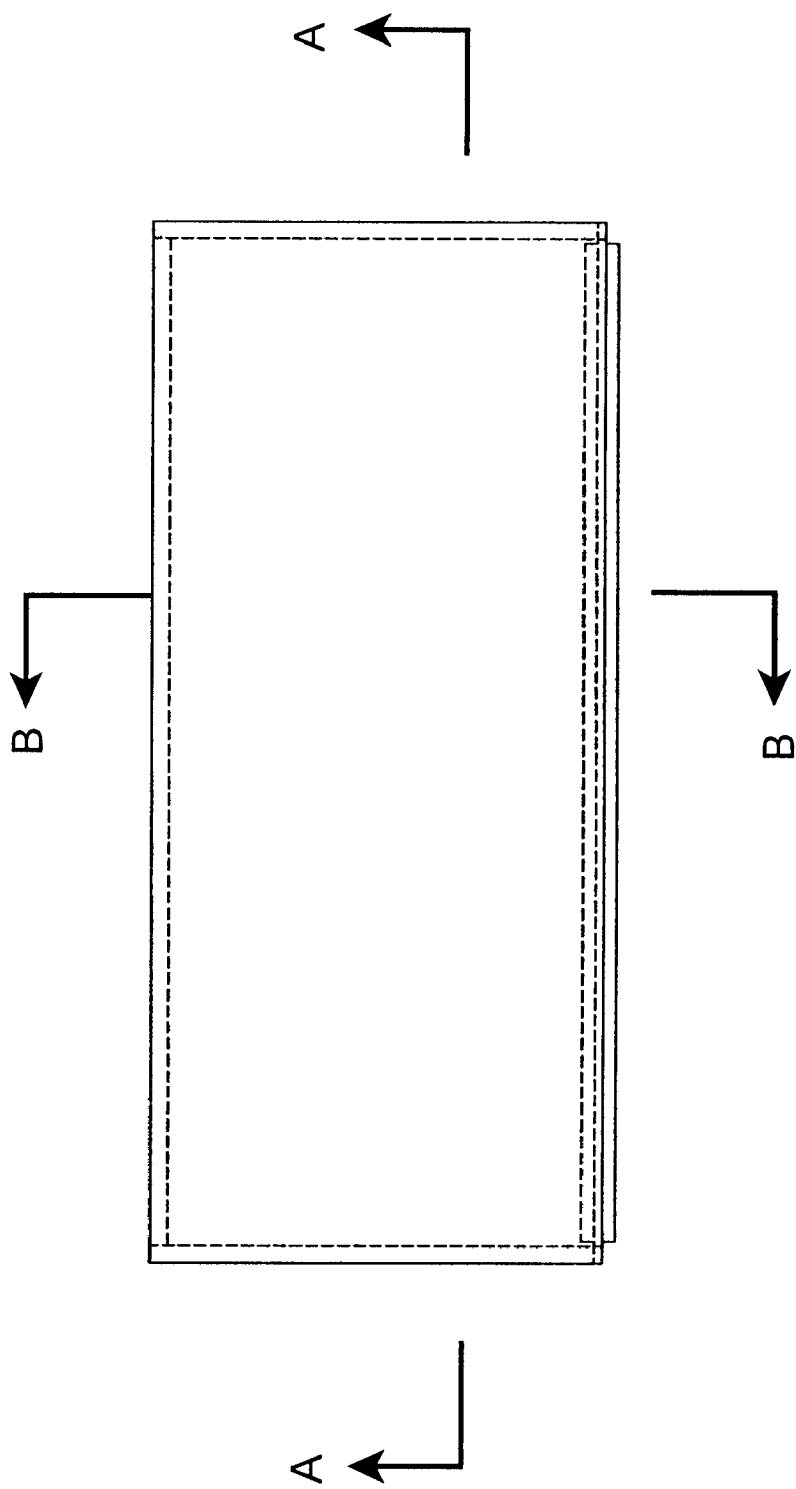
FIG. 2 is a top view of a 3-tier palletized ripening embodiment of a self-contained apparatus.

The instant invention provides improvements in a variety of areas. These improvements to the prior art ripening room include such areas as more uniform temperature control, efficiency in loading and unloading merchandise, operational flexibility, and the arrangement within a warehouse.

Each cabinet for maintaining a perishable product in a controlled environment includes an insulated chamber defined by an uppermost wall, a lowermost wall, and a plurality of perimeter walls (some as segment walls) connecting the uppermost wall and lowermost wall. The chamber has at least one segment and often is divided into at least two segments (three for the 2-tier embodiment). Each segment is sealed and baffled from each other, has at least two tiers and is configured to receive two rows deep and two rows across of produce within each tier. In an alternative embodiment, a cabinet may contain one or more rows deep and one or more rows across of produce within each tier. The rows of produce are sufficiently spaced apart from each other and in a relationship thereby defining an interstitial airspace therebetween, each row of produce being proximate and spaced apart from a respective of the perimeter walls to define a side airspace therebetween. A plurality of integral structural support locating means sufficient for supporting and positioning an independent replaceable structural support for produce to rest upon, lies within a lowermost portion of each tier. The chamber, segment, structural support, and tier are of a size that permits a standardized forklift truck, such as a narrow-aisle forklift or an automated forklift, to remove stacks of produce from the chamber.

The base lies juxtaposed and below the lowermost insulated chamber wall of each of the segments. An integral air control system housed within may include such components as a cooling and heating means, evaporator coils, and all necessary controls including a motor, constructed and arranged to support the weight of the chosen product above the base. The air control system is adapted to control air temperature and to transfer air between the side airspaces and interstitial airspaces. There are hatches, usually one for each segment, constructed and arranged to provide easy access to any component within the base for maintenance or cleaning needs. In a preferred embodiment, the hatches lie within the front wall of the base. There is also an airflow means for each segment, constructed and arranged to provide airflow in an up-flow direction into each segment, thereby causing air to flow between the interstitial and side airspaces. The airflow means is in fluid communication within the integral air control system. In a preferred embodiment, a means for introducing a gas such as ethylene into the chamber is provided. Consequently, an air venting means is provided to release any excess gas or air. Each cabinet contains a port for an exhaust fan and make-up air. The venting system may also include a carbon dioxide exhaust. Each cabinet has a sealable access means for providing ingress and egress to each of the segments. In a preferred embodiment, the sealable access is by way of two slidable doors which travel horizontally on tracks. The tracks are in sealing communication with the uppermost and lowermost insulated chamber walls.

Figure 3:
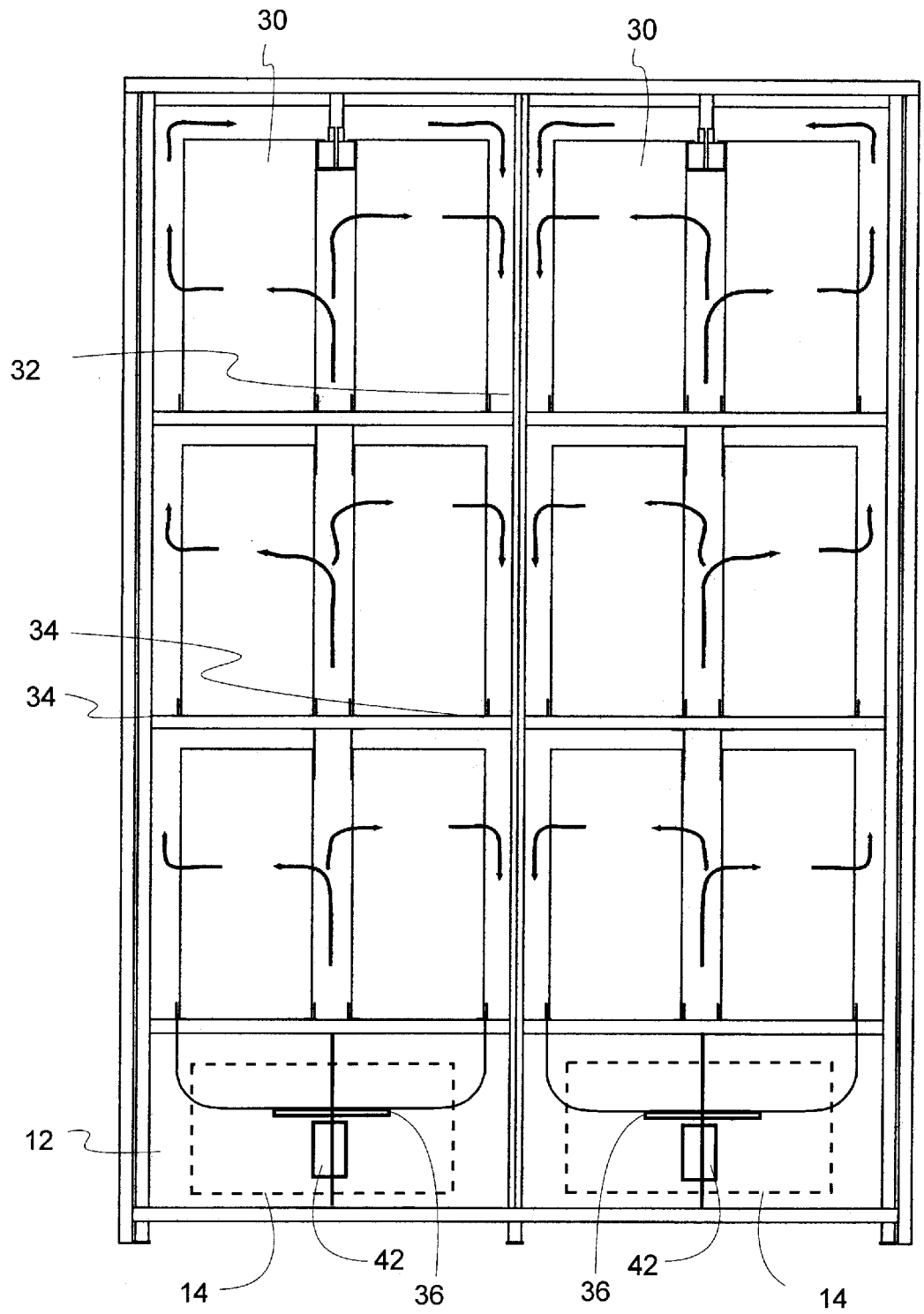
FIG. 3 is a front sectional view of a 3-tier palletized ripening embodiment of a self-contained apparatus.
Figure 4:
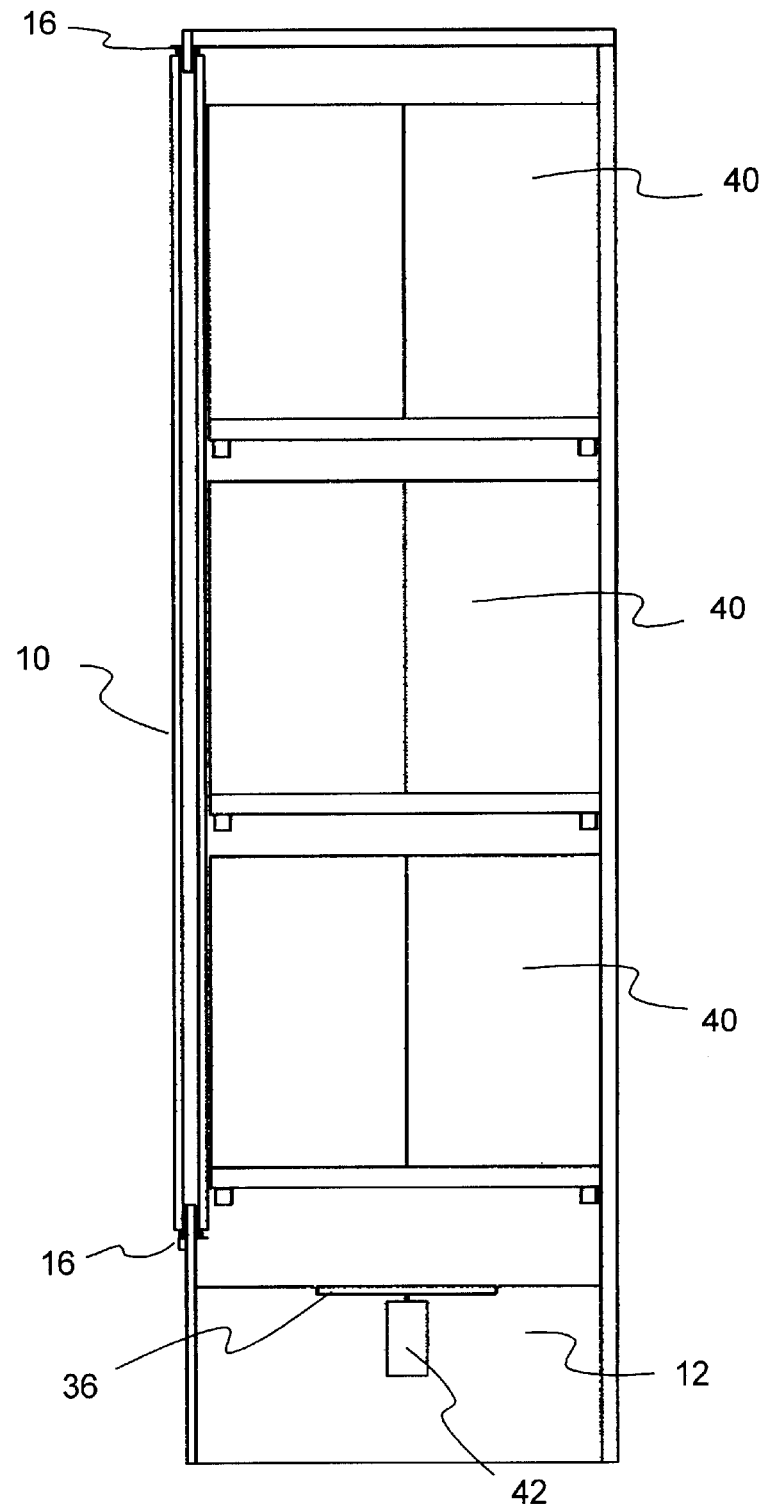
FIG. 4 is a side sectional view of a 3-tier palletized ripening embodiment of a self-contained apparatus.
Figure 5:
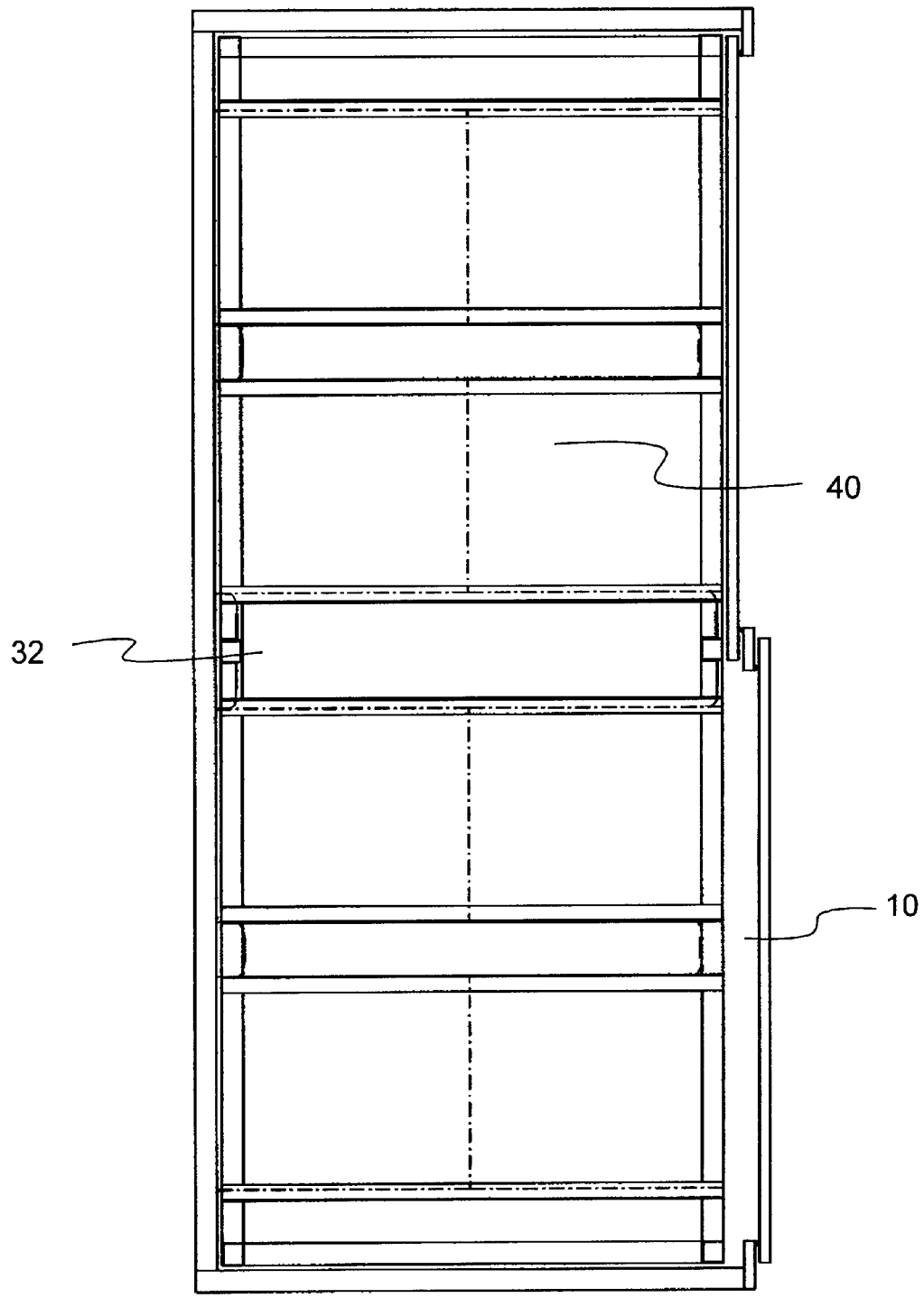
FIG.5 is a top sectional view of a 3-tier palletized ripening embodiment of a self-contained apparatus.

As illustrated in FIGS. 1–5, the chamber of a 3-tier palletized ripening cabinet embodiment which enhances ripening is divided into segments 30. The walls 32 between each segment are sealed and baffled to allow each segment 30 to act as an individual unit. Each tier 40 within a segment 30 contains a plurality of integral structural support locating means 34 adapted to particularly position each individual structural support. Essentially, the integral structural support locating means acts as a shelf to support and specifically position each pallet stacked with produce in order to maintain interstitial and side airspaces for ideal air flow within the chamber. Thus, easy loading and unloading is provided and proper airflow throughout each segment is maintained. Specifically, each tier is constructed to receive four pallets (two deep and two across) stacked with a perishable product. The front of each tier is lined with seals along each side wall. FIG. 3 best illustrates the airflow (arrows) within each segment which originates from the airflow means 36 and travels up through each tier 40 as occurs with the presence of stacked produce upon a pallet.

The apparatus is designed to create a pressure differential for ideal airflow within the chamber. Air circulates along a continuous flow path. Air from the airflow means, such as a forced-air fan, becomes pressurized as it passes the space between two evaporator coils within the base 12, causing the now pressurized air to flow upward along either side of each segment 30 of the chamber. As illustrated in a preferred embodiment, a structural support is provided for idealized airflow in that as pressurized air flows upward along the airspace between a wall and a side of a pallet, air becomes depressurized in the airspace between two pallets, thus forcing air to cross through the produce stacked upon a pallet and back into a pressurized airspace. Produce is stored in protective boxes, wherein each box includes side openings to permit air circulation therethrough. In the event a chamber is not filled to capacity with product, a type of structural support may be placed within each empty tier to maintain an idealized airflow.

Figure 6:
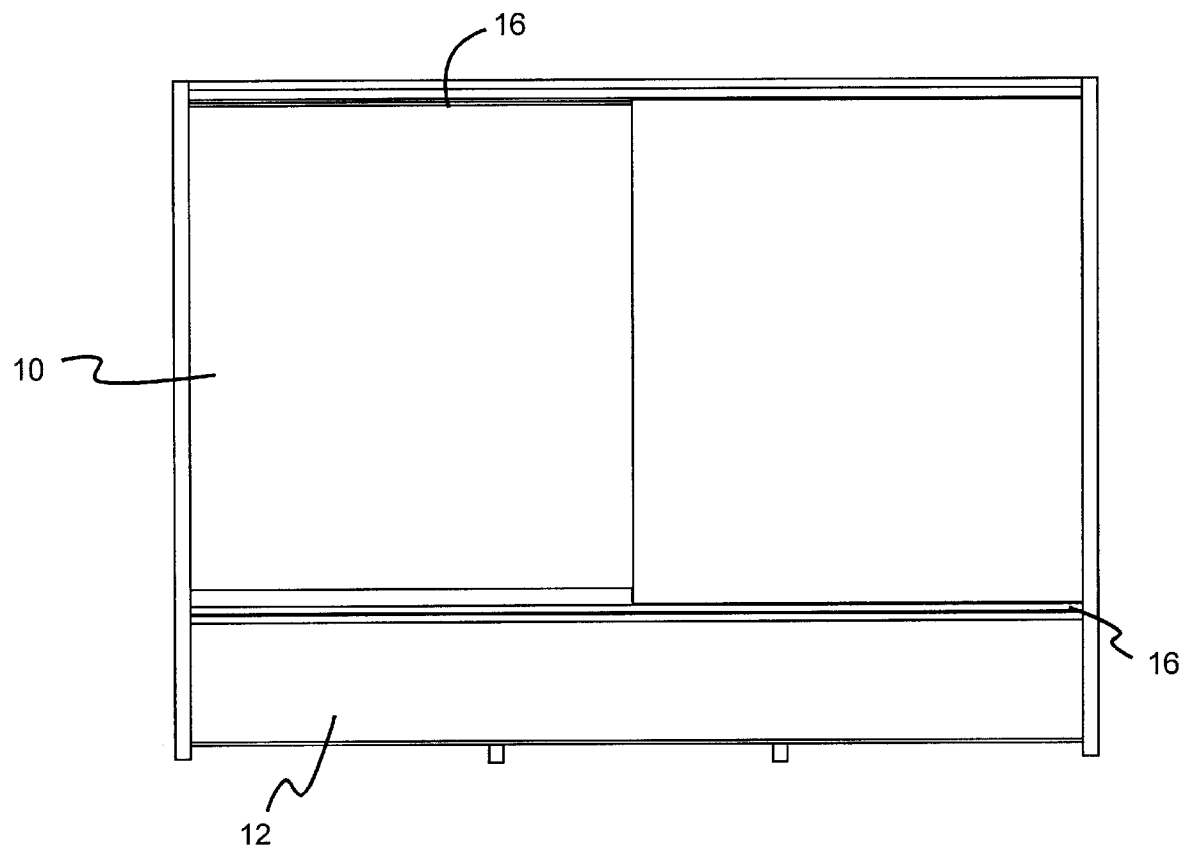
FIG. 6 is a front view of a 2-tier palletized ripening embodiment of a self-contained apparatus.
Figure 7:
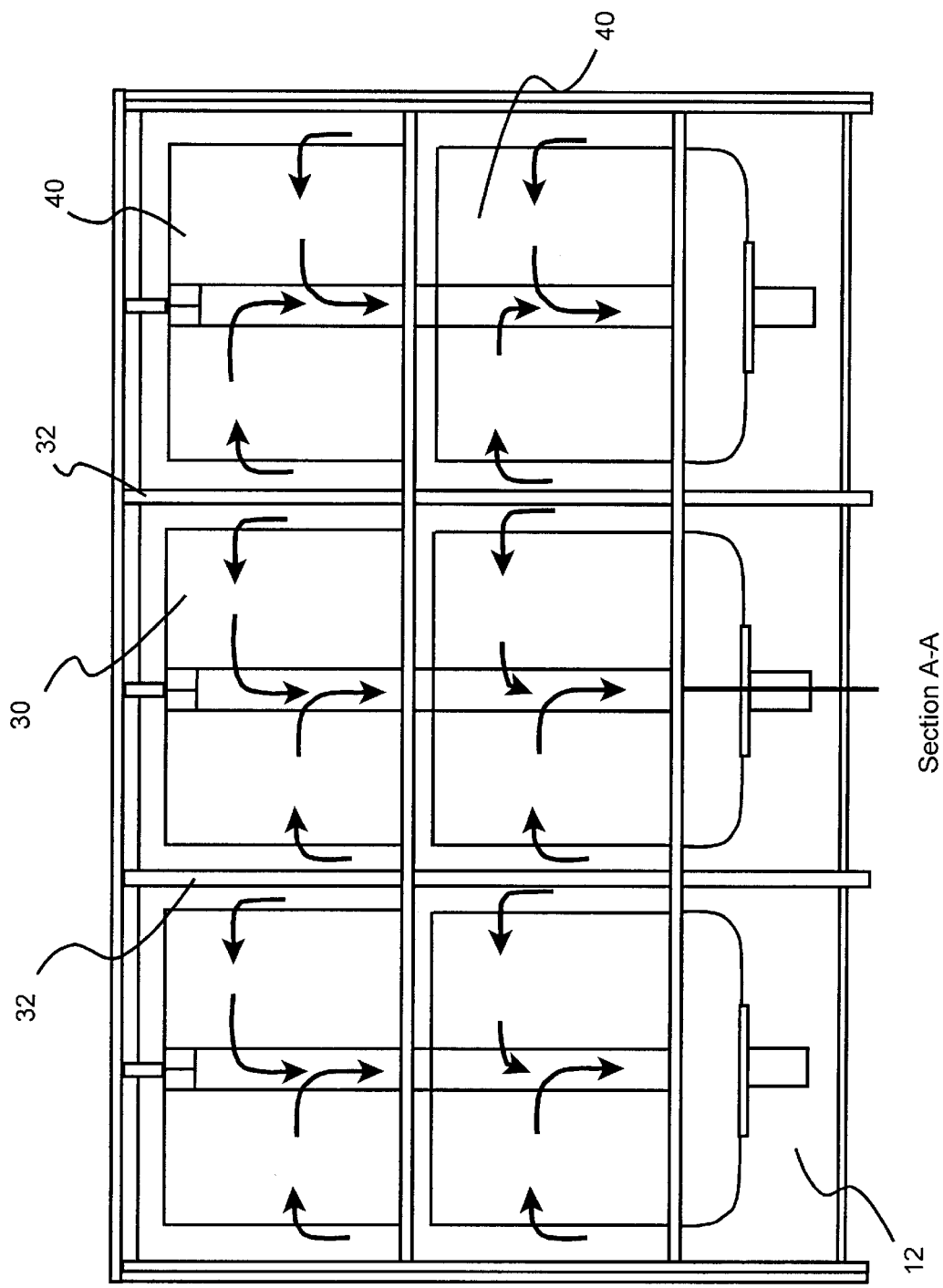
FIG. 7 is a front sectional view of a 2-tier palletized ripening embodiment of a self-contained apparatus.

The chamber of a 2-tier palletized ripening cabinet embodiment in FIGS. 6 and 7 also enhances ripening and holds twenty-four pallets stacked with perishable product. However, instead of two segments with three tiers in height, there are three segments 30 each two tiers 40 in height. In relation to a 3-tier apparatus, the length of the cabinet is subsequently larger and the height is smaller.

In a preferred embodiment, the narrow-aisle reach-type forklifts 80 are utilized. As the forklift approaches the palletized ripening cabinet, the outriggers are placed under the cabinet as the forks are slid into the pallet. The palletized cabinet is then elevated to allow the outriggers underneath. Next, a pallet is lifted from the "select" rack, and the forklift backs into the driveway while lowering the pallet and turning, accomplished all in one smooth motion. Since the perishable product, generally produce such as bananas, arrives already packed in ventilated, corrugated cardboard boxes on pallets, loading within a controlled environment apparatus requires little adjustment. It is estimated that the instant invention may require only a fourth of the typical operational labor and "drive-in" forklift time for a ripening room. Due to the nature of the "reach-in" style for loading and unloading purposes, an additional embodiment provides for the use of automated narrow-aisle reach-type forklifts for automated picking within ripening rooms, as opposed to manual picking, which is becoming more common in large distribution centers.

Use of these narrow-aisle reach-type forklifts 80 also provides a reduction in air volume thus reducing refrigeration load, a reduction in the amount of ethylene required to commence the ripening process, a reduction in the amount of humidification and venting time, and a reduction in loading and unloading time, thereby minimizing overall equipment costs.

A preferred embodiment of the self-contained apparatus also yields a reduction in overall energy consumption. A typical ripening room employs about four fans within the same space occupied by the footprint of the palletized cabinet, whereas, in a preferred embodiment, the palletized cabinet of the instant invention is configured with two large, forced-air fans 36 for the 3-tier cabinet (FIG. 3). These fans force (in cubic feet per minute per pound) approximately 0.6 CFM/lb through the fruit boxes in order to control the temperature of the fruit. The larger, lower speed, forced-air fans employed in the palletized cabinet work at a higher efficiency and consequently require less energy than the total of a typical ripening room's four fans.

The unit cooler is located within the base of a cabinet with access by way of a hatch 14 under each segment 30 at the front of the base 12. This placement design offers easy access for maintenance and cleaning. By way of example, servicing the ripening room refrigeration device or unit cooler, heretofore, often required complete emptying of the room, after which one needed to be raised on a forklift or a scissors-lift platform several feet in the air in order to reach the cooler area. Further, the preferred bottom mounted refrigeration unit greatly reduces the risk of particulate water damaging cartons or cardboard boxes full of product. Although not a preferred embodiment, it is nevertheless contemplated by this invention to arrange the modular units having the cooling unit mounted above the uppermost wall of the chamber. For this, the modular construction would require adequate support for the additional weight.

Because typical ripening rooms are long, the overhead unit coolers must utilize either very long evaporator coils, which are typically of a length approximately twenty-eight feet, or a series of shorter coils. In either case, the need to achieve accurate temperature control throughout the length of the room can pose a problem, particularly for direct expansion evaporators. In order to achieve such uniformity, the evaporator coils in the apparatus of the instant invention are generally maintained at a length of eight feet.

Most ripening rooms use sectional overhead doors which are not sufficiently airtight. Those doors typically consist of two foot panels. For comparison purposes, a 3-tier door would require the incorporation of twelve such panels, each of which being sealed to the panel above or below it. With that many feet of seals, there is an increased chance for air leakage. Also, the wiper seals on the sides of the overhead door bridge the cracks between the door panels, thereby creating numerous potential sources for leaks. Finally, the bulb gasket at the base of the ripening room door sits against the concrete floor. Waviness in the concrete surface can create air gaps.

However, the two slab doors 10 of the controlled environment apparatus, as instantly disclosed, travel horizontally on tracks 16. Wiper seals lay against the smooth, flat door surface to minimize air leakage and heat transfer. Although access is allowed to several pallets at a time, the slab door 10 does not protrude into the aisle, therefore the aisles may be more narrow. Additionally, the design of the door aids in a reduction in potential damage to the door. In a preferred embodiment, the door opening of the palletized cabinet is framed in metal to tolerances, which ensure a good seal. In a further preferred embodiment, the doors are constructed to slide in an accordion manner.

Figure 8:
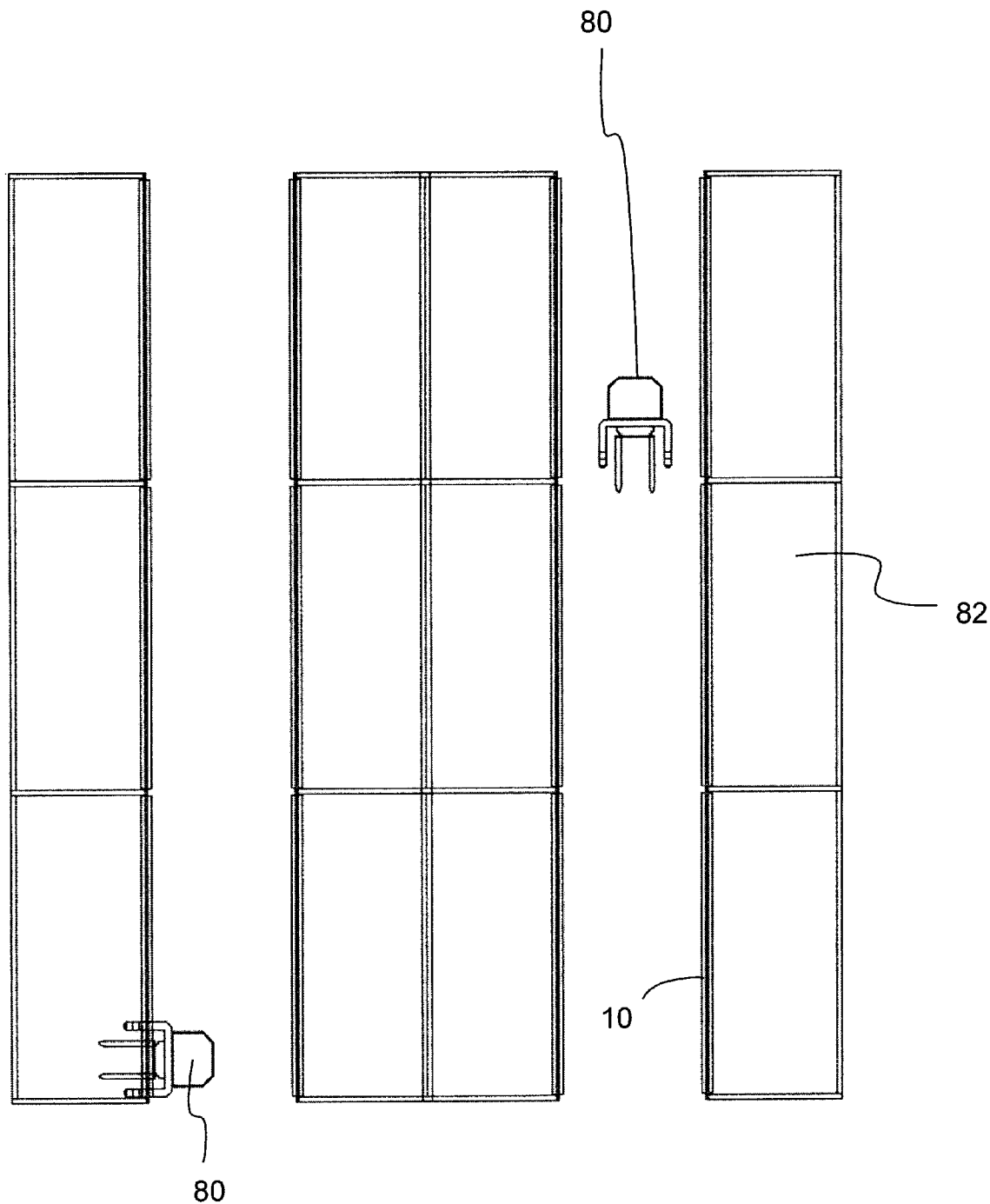
FIG. 8 demonstrates a standard arrangement of a plurality of the 3-tier self-contained palletized ripening cabinet within a warehouse.
Figure 9:
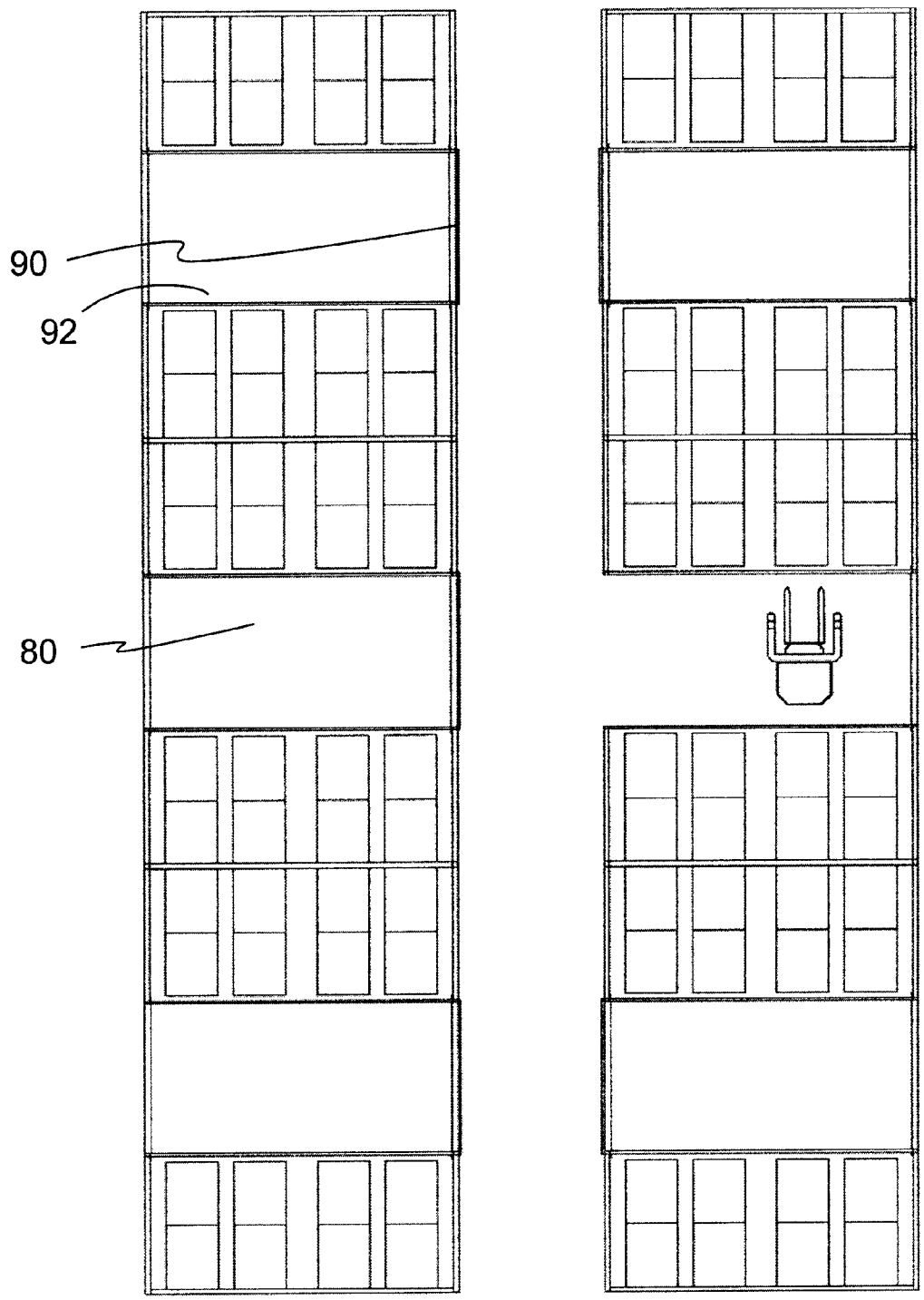
FIG. 9 illustrates an arrangement within a warehouse where two 3-tier self-contained palletized ripening cabinets share the same door and temperature controls.

In another preferred embodiment, the cooperation of two palletized ripening cabinets is employed, as opposed to a traditional layout (FIG. 8), as illustrated with the 3-tier embodiment 82 in FIG. 9. A relatively high density footprint (in square feet per pallet) and a concomitantly low cost configuration can be achieved by locating two banks of cabinets facing one another with about a nine foot aisle. The space between the cabinets is paneled to form a room. The nine foot opening to the room has an inexpensive door 90 to be shared by the two cabinets, neither of which has a door 92. One 48-pallet room may be formed from combining two cabinets. Cost savings is achieved by sharing one door and one set of temperature controls. Though both cabinets will have to be gassed at the same time, different temperatures can be maintained within each cabinet so that one load of twenty-four pallets may be uniformly and completely ripened a predetermined time before the other load.

Besides the versatility and other features provided by the design of the present invention, there are several areas in which the self-contained apparatus provides an initial cost advantage over a typical ripening room. The "select rack" type pallet is a more simplified version of the "drive-in" style and therefore is less expensive. A single forced-air fan 36 increases efficiency and saves energy over multiple fan designs. In addition, the forced-air fan's motor control panel with disconnect 42 is much more cost effective. The horizontal sliding door 10 used does not require the multitude of complex parts or springs of a typical ripening room's sectional overhead door. Also, the motor may be much smaller since it is not required to lift the door. The prior art ripening room unit cooler is often supported from the insulated panel. Contrary to the expensive steel evaporator support structure used to distribute the loads to the panel sidewalls, the cabinet of the instant invention can use thinner, non-load bearing panels and a much simpler evaporator support structure for a resulting lower cost. The reduced panel and rack materials required per pallet also results in a reduced initial cost. Moreover, unlike the palletized ripening cabinet of the instant invention, prior art ripening rooms require steel lined concrete curbs at a substantial cost.

Many of these advantages can be utilized within other controlled environments. Various types of coolers may be employed for the inhibition of the ripening process, while freezers and controlled atmosphere environment cabinets maintain the physiological condition of a product. Either embodiment can be quickly and easily placed in an inexpensive warehouse without concern of compromising quality or damage from contamination from adjacent products producing unwanted odors or ethylene. In this preferred embodiment, the forced air fans would be replaced with a less powerful fan used just for circulation requirements. The refrigeration unit cooler would be designed for the lower temperatures necessary for coolers and freezers. Defrost heaters and timers would also be included along with electric heaters for the door seals in the freezer embodiment. The preferred embodiment of the palletized freezer cabinet would also require the construction necessary to provide added insulation in the panel walls to maintain subzero temperatures. Additionally, the construction of a freezer cabinet may be adapted to provide a blast of forced-air from the cooling assembly. Ultimate flexibility is achieved by the ability to group cooler, freezer, and ripening cabinets within the same warehouse space. Further, forklift operators, maintenance personnel, technicians, and their respective equipment are not subjected to the harsh and dangerous environments generally found in cold rooms and freezers. In a further preferred embodiment, a controlled atmosphere environment could be achieved to maintain the physiological condition of a product, with added safety, since the palletized cooler cabinet is built to avoid potential leakage and thus provides an ideal overall design for use.

The instant invention may also be adapted for use as a pre-cooler. Although similar to the palletized ripening cabinet which enhances ripening and the cooler cabinet which inhibits ripening, the preferred embodiment specific to a palletized pre-cooler cabinet is that the refrigeration system is enlarged to produce 20 BTU/lb and the forced air system is increased to 1.5 CFM/lb. Because they are self-contained and easy to erect, a palletized pre-cooler cabinet can be easily installed in packing sheds or on loading platforms near a farm site where building a cold room for pre-coolers would otherwise not be feasible.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An apparatus useful for maintaining perishable product in a controlled environment, comprising:

an insulated chamber defined by an uppermost wall, a lowermost wall, and a plurality of perimeter walls connecting said uppermost wall and said lowermost wall, said chamber having at least one segment, each said segment sealed and baffled from each other and having at least one tier, wherein each said tier is configured to receive two rows deep and two rows across of produce, said two rows deep and two rows across of produce being in a spaced apart relationship thereby defining an interstitial airspace therebetween, and each row of produce being proximate and spaced apart from a respective of said perimeter walls to define a side airspace therebetween;

airflow means constructed and arranged to provide airflow in an up-flow direction into each said segment, thereby causing air to flow between said interstitial and said side airspaces;

a base, positioned juxtaposed and below said lowermost insulated chamber wall of each said segment, said base including an integral air control system adapted to control air temperature and to transfer air between said interstitial and said side airspaces; whereby said airflow means is in fluid communication with said integral air control system;

at least one hatch constructed and arranged to provide access within said base;

a plurality of integral structural support locating means adapted to particularly position each structural support whereby said interstitial and said side airspaces are maintained;

an air venting means; and, sealable access means for providing ingress and egress to each of said segments.

2. An apparatus as in claim 1, wherein said airflow means is a forced-air fan.

3. An apparatus as in claim 1, further including a means for introducing a gas into said chamber.

4. An apparatus as in claim 3, wherein said gas is ethylene.

5. An apparatus as in claim 1, wherein said structural support is a pallet.

6. An apparatus as in claim 1, wherein said produce is stored in protective boxes, each said protective box including side openings to permit air circulation therethrough.

7. An apparatus as in claim 1, wherein said chamber, said segment, said structural support, and said tier are of a size that permits a standardized forklift truck to remove stacks of said produce from said chamber.

8. An apparatus as in claim 1, wherein said sealable access means are two slidable doors, said doors traveling horizontally on tracks, said tracks in sealing communication with said uppermost and said lowermost insulated chamber walls.

9. An apparatus as in claim 1, wherein said controlled environment enhances ripening.

10. An apparatus as in claim 1, wherein said controlled environment inhibits ripening.

11. An apparatus as in claim 1, wherein said controlled environment maintains physiological condition.

* * * * *